(12) United States Patent
Kim et al.

(10) Patent No.: US 9,748,533 B2
(45) Date of Patent: Aug. 29, 2017

(54) BATTERY MODULE

(71) Applicant: Samsung SDI Co., Ltd., Yongin-si, Gyeonggi-do (KR)

(72) Inventors: Sukkyum Kim, Yongin-si (KR); Dongjin Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 8 days.

(21) Appl. No.: 15/007,061

(22) Filed: Jan. 26, 2016

(65) Prior Publication Data

US 2016/0226036 A1 Aug. 4, 2016

(30) Foreign Application Priority Data

Feb. 3, 2015 (KR) .................. 10-2015-0016697

(51) Int. Cl.
*H01M 2/02* (2006.01)
*H01M 2/10* (2006.01)
(Continued)

(52) U.S. Cl.
CPC .......... *H01M 2/1016* (2013.01); *H01M 2/10* (2013.01); *H01M 2/1022* (2013.01);
(Continued)

(58) Field of Classification Search
CPC .... H01M 2/1016; H01M 2/10; H01M 2/1211; H01M 2/204; H01M 2/206;
(Continued)

(56) References Cited

U.S. PATENT DOCUMENTS

2011/0076521 A1* 3/2011 Shimizu .............. H01M 2/1061 429/7
2011/0117401 A1* 5/2011 Lee .................... H01M 2/0245 429/82
(Continued)

FOREIGN PATENT DOCUMENTS

EP 2 475 028 A1 7/2012
JP 2010-287514 A 12/2010
(Continued)

OTHER PUBLICATIONS

Extended European Search Report dated Jul. 6, 2016 issued in corresponding EP Application No. 16154113.1-1360, 6 pages.
(Continued)

*Primary Examiner* — Cynthia K Walls
(74) *Attorney, Agent, or Firm* — Lewis Roca Rothgerber Christie LLP

(57) ABSTRACT

A battery module is provided including a secondary battery unit having a plurality of secondary batteries spaced from each other, the plurality of secondary batteries each including electrode terminals and a safety vent which are arranged on one side of the secondary battery unit; a compression plate wrapping at least a portion of the secondary battery unit and compressing the secondary battery unit together; and an insulation cover covering the electrode terminals and the safety vent, the insulation cover including a duct connected to the safety vent to guide gases exhausted from the safety vent to a first location, and a vent hole member coupled to the duct at the first location.

10 Claims, 5 Drawing Sheets

(51) Int. Cl.
  *H01M 2/12* (2006.01)
  *H01M 2/34* (2006.01)
  *H01M 2/20* (2006.01)
(52) U.S. Cl.
  CPC ....... *H01M 2/1072* (2013.01); *H01M 2/1211* (2013.01); *H01M 2/1264* (2013.01); *H01M 2/202* (2013.01); *H01M 2/204* (2013.01); *H01M 2/34* (2013.01); *H01M 2/206* (2013.01); *H01M 2220/20* (2013.01); *H01M 2220/30* (2013.01)
(58) Field of Classification Search
  CPC ............. H01M 2/1022; H01M 2/1072; H01M 2/1264; H01M 2/202; H01M 2/34; H01M 2220/20; H01M 2220/30
  See application file for complete search history.

(56) References Cited

U.S. PATENT DOCUMENTS

2011/0212352 A1   9/2011  Wood et al.
2013/0330579 A1  12/2013  Ejiri et al.

FOREIGN PATENT DOCUMENTS

| JP | 2011-71097 | | 4/2011 |
| JP | 2011-222419 | A | 11/2011 |
| JP | 2013-171746 | A | 9/2013 |
| KR | 10-2011-0044129 | | 4/2011 |
| KR | 10-2011-0055371 | | 5/2011 |

OTHER PUBLICATIONS

English Machine Translation of Japanese Publication 2010-287514 A, dated Dec. 24, 2010, 22 pages.
English Machine Translation of Japanese Publication 2011-222419 A, dated Nov. 4, 2011, 29 pages.
English Machine Translation of Japanese Publication 2013-171746 A, dated Sep. 2, 2013, 39 pages.
KIPO Office action dated Mar. 2, 2016, for Korean priority Patent application 10-2015-0016697, (4 pages).
English machine translation of Japanese Publication 2011-71097 dated Apr. 7, 2011, listed above, (59 pages).

* cited by examiner

BATTERY MODULE

CROSS-REFERENCE TO RELATED APPLICATION

This application claims priority to and the benefit of Korean Patent Application No. 10-2015-0016697 filed on Feb. 3, 2015 in the Korean Intellectual Property Office, and all the benefits accruing therefrom under 35 U.S.C. 119, the entire contents of which are herein incorporated by reference.

BACKGROUND

1. Field

The present invention relates to a battery module.

2. Description of the Related Art

Secondary batteries are relatively easy to be applied by product group, have advantageous electrical properties, such as high energy density, and are widely applied to not only portable devices but also electric vehicles (EVs) or hybrid electric vehicles (HEVs), which are driven by electric power. In particular, since secondary batteries applied to EVs are fabricated in the form of a module to then be mounted in a relatively narrow space, for example, under a seat or in a trunk, they need to be fabricated to a minimized size. In addition, in order to mount a secondary battery module in a limited space, battery cells may be mounted in various configurations. In some cases, a degassing problem may occur to the battery cells.

SUMMARY

In embodiments, the present invention provides a battery module which has a minimized size and is capable of efficiently releasing gases, as described in more detail below.

According to an aspect of the present invention, there is provided a battery module including a secondary battery unit including a plurality of secondary batteries arranged with a predetermined interval in horizontal and vertical directions, the plurality of secondary batteries each including electrode terminals and a safety vent, which are arranged to one side of the secondary battery unit, a compression plate wrapping an exterior portion of the secondary battery unit in a band shape and compressing the secondary battery unit with a predetermined pressure, and an insulation cover covering the electrode terminals and the safety vent, including a duct connected to the safety vent to guide gases exhausted from the safety vent to move to a first position, and a vent hole member coupled to be connected to the duct at the first position.

The battery module may further include a fixing cover unit positioned between the secondary battery unit and the compression plate and covering the secondary battery unit to fix positions of the plurality of secondary batteries.

The fixing cover unit may further include a top cover covering a top portion of the secondary battery unit and including a first barrier for separating the plurality of secondary batteries arranged in the horizontal direction from each other by a predetermined distance, a bottom cover covering a bottom portion of the secondary battery unit and including a second barrier for separating the plurality of secondary batteries arranged in the horizontal direction from each other, and a third barrier coupled between the top cover and the bottom cover and separating the plurality of secondary batteries arranged in the vertical direction from each other by a predetermined distance.

The battery module may further include a busbar holder positioned between the secondary battery unit and the insulation cover, coupled to the fixing cover unit and including busbars electrically connected to the electrode terminals.

The battery module may further include a plurality of gaskets each coupled to a position corresponding to the safety vent while passing through the busbar holder, including a plurality of gas holes corresponding to the safety vents of the plurality of secondary batteries arranged in the vertical direction, the plurality of gaskets connecting the duct and the safety vents of the plurality of secondary batteries arranged in the vertical direction.

Ends of the busbar holder may be coupled to ends of the fixing cover unit through bolt engagement, at least one protrusions may be formed on top and bottom surfaces of the fixing cover unit, and ring-shaped hooking portions may be formed at top and bottom ends of the busbar holder, so that the protrusions are forcibly coupled to the hooking portions.

Ends of the insulation cover may be coupled to ends of the fixing cover unit together with the ends of the busbar holder through bolt engagement.

The battery module may further include a protective circuit unit electrically connected to the secondary battery unit through the busbars and disposed at the other side of the secondary battery unit.

The compression plate may include an upper compression plate compressing the secondary battery unit while covering the top portion of the secondary battery unit, and a lower compression plate combined with the upper compression plate and compressing the secondary battery unit while covering the bottom portion of the secondary battery unit, Here, ends of the upper compression plate are stepwise bent, and ends of the lower compression plate are welded to the ends of the upper compression plate in a state in which the ends of the lower compression plate are positioned at interior sides of the ends of the upper compression plate.

The insulation cover may further include a duct groove connected to the safety vent and a duct cover member covering the duct groove and combined with the insulation cover, constituting a duct structure.

As described above, the battery module according to embodiments of the present invention has a minimized size and is capable of efficiently releasing gases.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, a battery module according to an embodiment of the present invention will be described with reference to the accompanying drawings.

Figure 1:
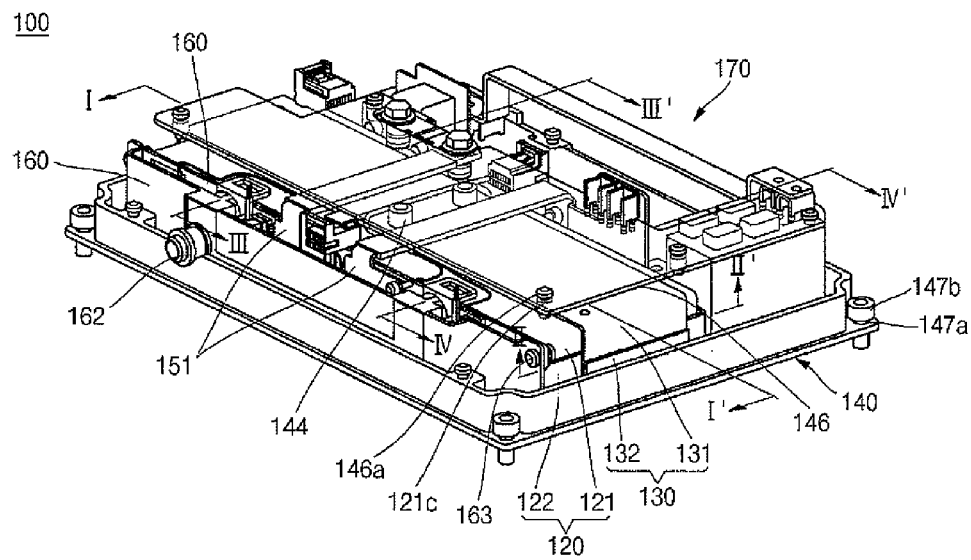
FIG. 1 is a perspective view of a battery module according to an embodiment of the present invention.
Figure 2:
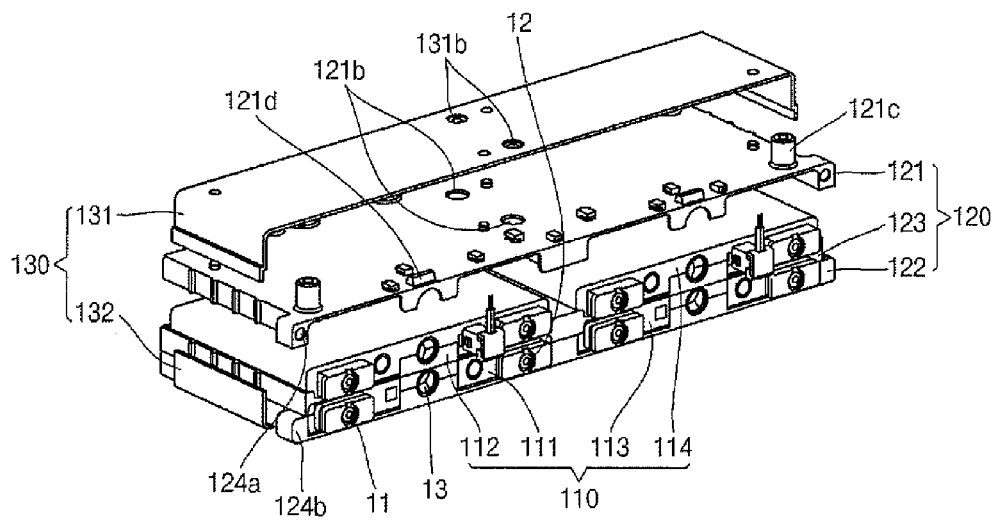
FIG. 2 is an exploded perspective view illustrating a secondary battery unit, a cover unit and a compression unit according to an embodiment of the present invention.
Figure 3:
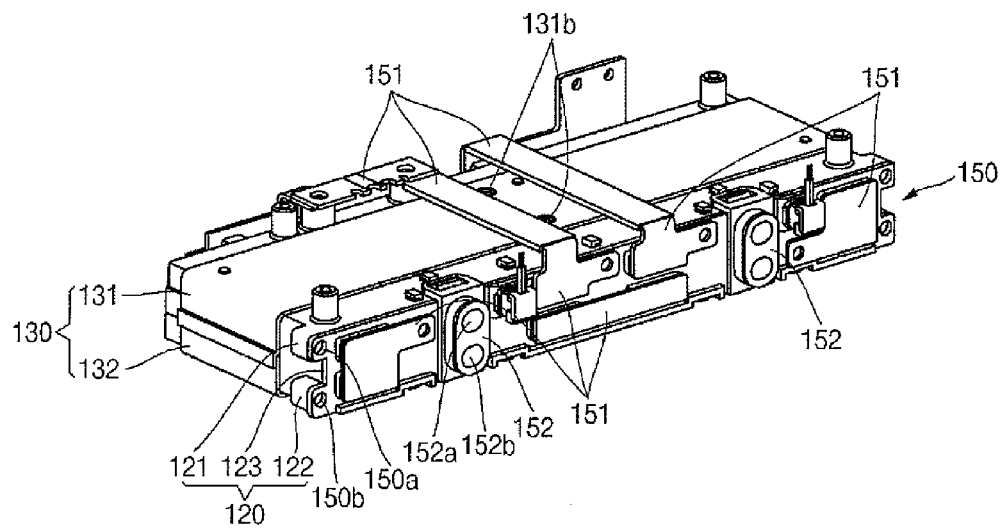
FIG. 3 is a perspective view illustrating a busbar holder, busbars, and a gas release assembly assembled with the secondary battery unit illustrated in FIG. 2.
Figure 4:
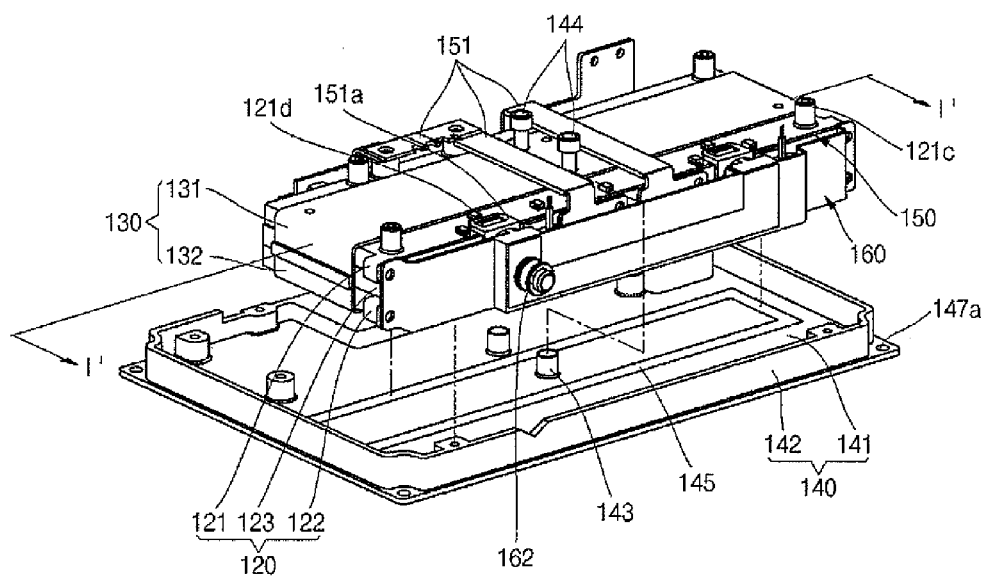
FIG. 4 is a perspective view illustrating a housing, an insulation cover vent, and a hole member assembled with the secondary battery unit illustrated in FIG. 3.
Figure 5:
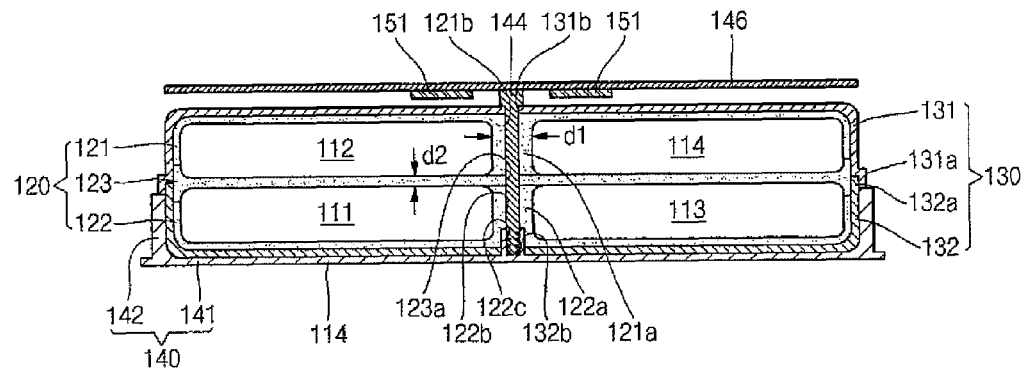
FIG. 5 is a cross-sectional view taken along the line I-I' of FIG. 1.
Figure 6:
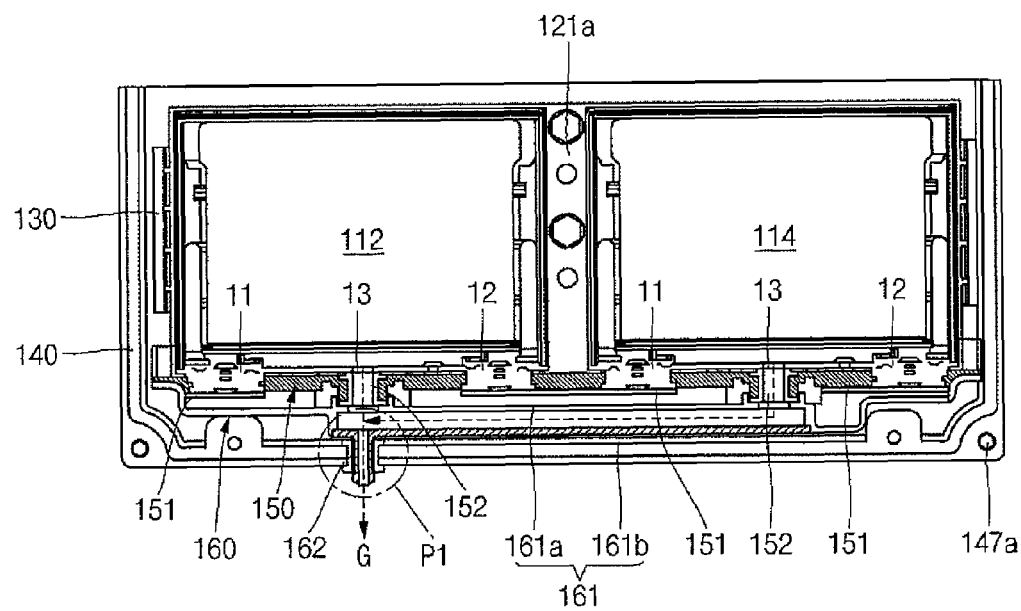
FIG. 6 is a cross-sectional view taken along the line II-II' of FIG. 1.
Figure 7:
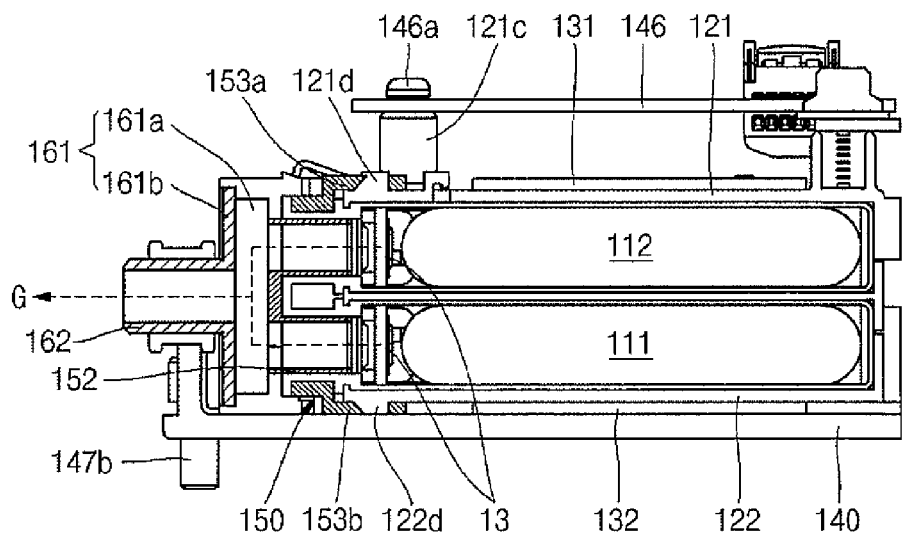
FIG. 7 is a cross-sectional view taken along the line of III-III' FIG. 1.
Figure 8:
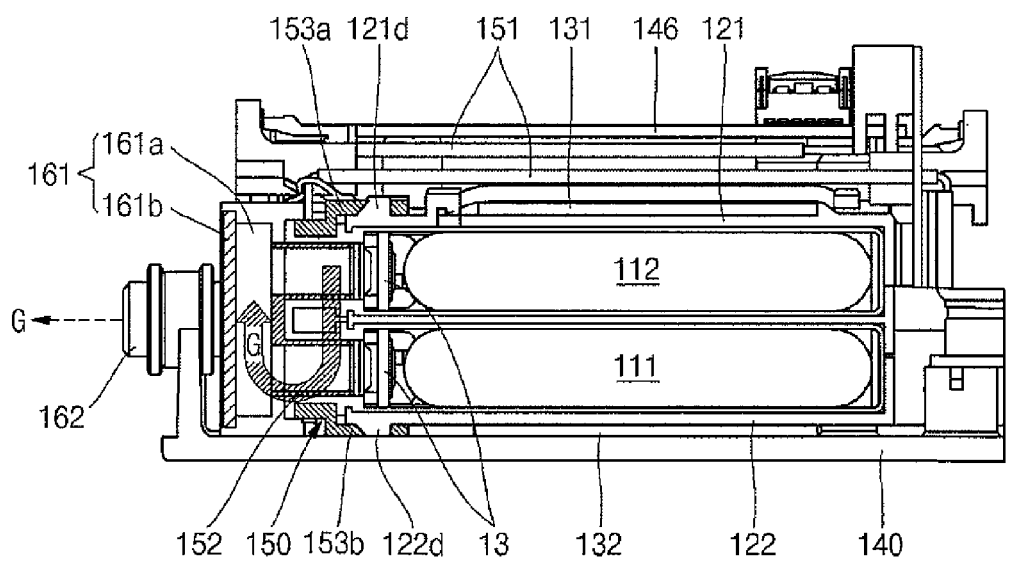
FIG. 8 is a cross-sectional view taken along the line IV-IV' of FIG. 1.
Figure 9:
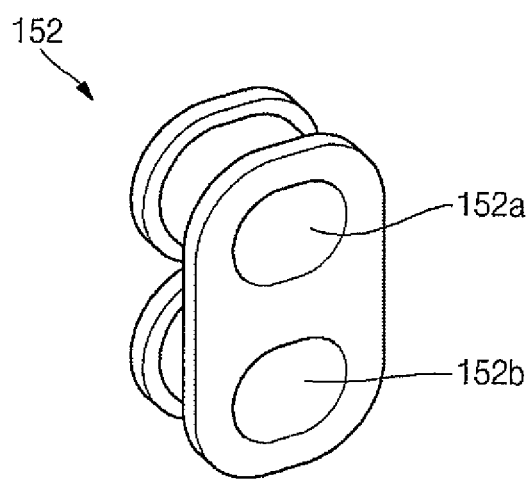
FIG. 9 is a perspective view of a gasket according to an embodiment of the present invention.

FIG. 1 is a perspective view of a battery module according to an embodiment of the present invention, FIG. 2 is an exploded perspective view illustrating a secondary battery unit, a cover unit and a compression unit according to an embodiment of the present invention, FIG. 3 is a perspective view illustrating a busbar holder, busbars and a gas release assembly assembled with the secondary battery unit illustrated in FIG. 2, FIG. 4 is a perspective view illustrating a housing, an insulation cover vent and a hole member assembled with the secondary battery unit illustrated in FIG. 3, FIG. 5 is a cross-sectional view taken along the line I-I' of FIG. 1, FIG. 6 is a cross-sectional view taken along the line II-II' of FIG. 1, FIG. 5 is a cross-sectional view taken along the line I-I' of FIG. 1, FIG. 7 is a cross-sectional view taken along the line III-III' of FIG. 1, FIG. 8 is a cross-sectional view taken along the line IV-IV' of FIG. 1, and FIG. 9 is a perspective view of a gasket according to an embodiment of the present invention.

Referring to FIGS. 1 to 9, the battery module 100 according to an embodiment of the present invention may include a secondary battery unit 110, a fixing cover unit 120, a compression plate 130, a housing 140, a busbar holder 150, an insulation cover 160 and a protection circuit unit 170.

As illustrated, for example, in FIGS. 2 and 5, the secondary battery unit 110 may include a plurality of secondary batteries 111, 112, 113, and 114 spaced by distances d1 and d2, respectively, in the horizontal (X-axis) and vertical (Z-axis) directions. In the following description, for a better understanding of a battery arrangement of the secondary battery unit 110, the battery arrangement structure will be described using a matrix.

With particular reference to FIG. 2, the secondary battery unit 110 may include first to fourth secondary batteries 111, 112, 113, and 114. In the secondary battery unit 110, the first secondary battery 111 may be arranged in the first row and the first column. The second secondary battery 112 may be arranged in the first row and the second column. The third secondary battery 113 may be arranged in the second row and the first column. The fourth secondary battery 114 may be arranged in the second row and the second column.

The first and third secondary batteries 111 and 113, and the second and fourth secondary batteries 112 and 114, are arranged in the horizontal direction and spaced by a distance d1 from each other. In addition, the first and second secondary batteries 111 and 112, and the second and fourth secondary batteries 113 and 114, are arranged in the vertical direction and spaced by distance d2 from each other.

Each of the first to fourth secondary batteries 111, 112, 113, and 114 may be shaped as a substantially rectangular parallelepiped including first and second electrode terminals 11 and 12 and a safety vent 13, and may be arranged in a lying position. However, the embodiment of the present invention does not particularly limit the arrangement structure of the secondary battery to that disclosed herein.

Accordingly, the secondary battery according to the embodiment of the present invention may be any shape known in the related art With reference to FIGS. 2 and 5, the fixing cover unit 120 may include a top cover 121, a lower cover 122, and a third barrier 123.

The top cover 121 may cover a top portion of the secondary battery unit 110. A first barrier 121a may be formed in the top cover 121. The first barrier 121a may separate the second and fourth secondary batteries 112 and 114 arranged in the horizontal direction and spaced by d1. For example, the first barrier 121a may protrude from the top cover 121 to then be positioned between the second and fourth secondary batteries 112 and 114. Therefore, the first barrier 121a may firmly fix positions of the second and fourth secondary batteries 112 and 114 to be maintained at the distance d1 without being separated from each other in a direction in which they face each other (i.e., in the X-axis direction). A first bolt through hole 121b passing through the first barrier 121a may be formed in the top cover 121.

The bottom cover 122 may cover a bottom portion of the secondary battery unit 110. A second barrier 122a may be formed in the bottom cover 122. The second barrier 122a may separate the first and third secondary batteries 111 and 113 arranged in the horizontal direction and spaced by d1. For example, the second barrier 122a may protrude from the bottom cover 122 to then be positioned between the first and third secondary batteries 111 and 113. Therefore, the second barrier 122a may firmly fix positions of the first and third secondary batteries 111 and 113 to be maintained at the without being separated from each other in a direction in which they face each other (i.e., in the X-axis direction). A second bolt through hole 122b passing through the second barrier 122a may be formed in the bottom cover 122. In addition, a bolt insertion groove 122c connected to the second bolt through hole 122b may be formed in the bottom cover 122. A bolt fastening unit 143 protruding from a bottom surface 141 of the housing 140 may be inserted into the bolt insertion groove 122c.

The third barrier 123 may be coupled between the top cover 121 and the bottom cover 122. Accordingly, the third barrier 123 may separate the first and second secondary batteries 111 and 112 and the third and fourth secondary batteries 113 and 114 arranged in the vertical direction from each other by distance d2. A third bolt through hole 123a may be formed in the third barrier 123. The third bolt through hole 123a may correspond to each of the first and second through holes 121b and 122b and may connect the first and second through holes 121b and 122b to each other.

As described above, the fixing cover unit 120 may cover the first to fourth secondary batteries 111, 112, 113, and 114 to fix arranged positions of the batteries. In addition, the fixing cover unit 120 may prevent unnecessary electrical contacts between each of the first to fourth secondary batteries 111, 112, 113, and 114 and may be made of an insulating material having an elastic force for securing a swelling space during volumetric expansion of the batteries. For example, portions of the fixing cover unit 120, for separating the batteries 111, 112, 113, and 114 from each other may occupy the swelling space to substantially prevent or minimize volumetric expansion of the first to fourth secondary batteries 111, 112, 113, and 114.

In one embodiment, the fixing cover unit 120 may be configured to electrically connect the first to fourth secondary batteries 111, 112, 113, and 114 to the protection circuit unit 190 and to have an open portion of a front side (Y-axis direction) to release gases.

The compression plate 130 may include an upper compression plate 131 and a lower compression plate 132. The compression plate 130 may be formed along the outer surface of the secondary battery unit 110 accommodated in the fixing cover unit 120 in a band shape and may compress the secondary battery unit 110 together.

The upper compression plate 131 may compress the secondary battery unit 110 while covering the top portion of the secondary battery unit 110. For example, the upper compression plate 131 may be bent to cover first side portions, top surfaces and second side portions of the second and fourth secondary batteries 112 and 114. A fourth bolt through hole 131b located to correspond to the first bolt through hole 121b may be formed in the upper compression plate 131.

The lower compression plate 132 may compress the secondary battery unit 110 while covering a bottom portion of the secondary battery unit 110. For example, the lower compression plate 132 may be bent to cover first side portions, top surfaces and second side portions of the first and third secondary batteries 111 and 113. Fastening unit through holes 132b located to correspond to the bolt insertion holes 122c may be formed in the lower compression plate 132. The bolt fastening units 143 may pass through the fastening unit through holes 132b.

The compression plate 130 may compress the secondary battery unit 110 together, thereby increasing coupling forces between each of the first to fourth secondary batteries 111, 112, 113, and 114. In addition, the compression plate 130 may compress the secondary battery unit 110 in horizontal and vertical directions, thereby minimizing the overall thickness and width of the secondary battery unit 110.

Ends 131a of the upper compression plate 131 may be bent stepwise. Accordingly, ends 132a of the lower compression plate 132 may be welded to the ends 131a of the upper compression plate 131 such that the lower compression plate 132 is on an interior side of the upper compression plate 131.

The ends 131a of the upper compression plate 131 are bent stepwise to increase contact areas between the ends 131a of the upper compression plate 131 and the ends 132a of the lower compression plate 132, which may increase welding areas, thereby more firmly coupling the upper compression plate 131 with the lower compression plate 132.

The upper compression plate 131 and the lower compression plate 132 may be made of a metal having high heat conductivity for facilitating welding and heat dissipation of the secondary battery unit 110.

The housing 140 may accommodate the fixing cover unit 120 and the secondary battery unit 110 and may be configured to be more firmly fastened with the secondary battery unit 110. Accordingly, the housing 140 may include a bottom surface 141, a plurality of sidewalls 142 connected to edges of the bottom surface 141, bolt fastening units 143 (FIG. 4), bolts 144 and an adhesive layer 145 (FIG. 4).

The bolt fastening units 143 may be formed on the bottom surface 141 of the housing 140 and may be configured to upwardly protrude. A thread may be formed on an internal surface of each of the bolt fastening units 143.

Each of the bolts 144 may sequentially pass the fourth bolt through hole 131b, the first bolt through hole 121b, the third bolt through hole 123a and the second bolt through hole 122b in that order to then be fastened with the bolt fastening units 143. A thread is formed at an end of each of the bolts 144 to then be engaged with the thread of each of the bolt fastening units 143.

As described above, the bolt fastening units 143 and bolts 144 may more firmly fasten the secondary battery unit 110 assembled by the fixing cover unit 120 and the compression plate 130 with the housing 140. In addition, the bolt fastening units 143 and the bolts 144 are formed to traverse the center of the secondary battery unit 110, thereby minimizing the number of components, compared to a case where the bolt fastening units 143 and the bolts 144 are formed at outer opposite sides of the secondary battery unit 110, and fixing the secondary battery unit 110 to the housing 140 in a more balanced manner. In addition, as the number of components for the bolt fastening units 143 and bolts 144 is minimized, space utilization efficiency of a module can be improved.

As shown in FIG. 4, the adhesive layer 145 is formed on the bottom surface 141 of the housing 140 to facilitate adhesion between the compression plate 130 and the housing 140. Accordingly, distortion of the secondary battery unit 110 can be prevented or minimized. In addition, the shape of the adhesive layer 145 may be bent at least one time to maximize a contact area between the compression plate 130 and the bottom surface 141 of the housing 140, thereby allowing heat generated from the secondary battery unit 110 to be more efficiently transferred through the housing 140. Therefore, the housing 140 may be made of a metal having high heat conductivity for heat dissipation from the secondary battery unit 110. For example, the housing 140 may be made of aluminum.

In one embodiment, with reference to FIG. 1, the housing 140 may further include a top cover 146 for protecting the top portion of the secondary battery unit 110. The top cover 146 may be fixed to the top portion of the secondary battery unit 110 such that cover fastening units 121c formed at four corners of a top surface of the top cover 121 are engaged with bolts 146a.

In addition, the housing 140 may include coupling holes 147a formed at its four corners to fix the battery module 100 at a particular position of a vehicle. Accordingly, the battery module 100 may be mounted on the vehicle such that through fixing bolts 147b are coupled to particular positions of the vehicle through the coupling holes 147a.

Referring to FIG. 3, the busbar holder 150 is positioned between the secondary battery unit 110 and the insulation cover 160 and may be combined with the fixing cover unit 120 through bolt engagement. For example, first top coupling holes 150a may be formed at ends of a top portion of the busbar holder 150 and first bottom coupling holes 150b may be formed at ends of a bottom portion of the busbar holder 150. In addition, top holder fastening units 124a (FIG. 2) may be formed at ends of the top cover 121 and bottom holder fastening units 124b (FIG. 2) may be formed at ends of the bottom cover 122. In one embodiment, the first top coupling holes 150a may correspond to the top holder fastening units 124a and the first bottom coupling holes 150b may correspond to the correspond to the bottom holder fastening units 124b. Accordingly, the busbar holder 150 may be firmly combined with the fixing cover unit 120 through coupling bolts 163.

Busbars 151 and multi-gaskets 152 may be assembled with the busbar holder 150. The busbars 151 may make electrically contact with the first and second electrode terminals 11 and 12 by coupling the busbar holder 150 to the fixing cover unit 120. The busbars 151 may connect the first to fourth secondary batteries 111, 112, 113, and 114 to one another in series, in parallel or in series and parallel combined manner. Embodiments of the present invention do not limit the connection manner of the first to fourth secondary batteries 111, 112, 113, and 114 using the busbars 151 to those disclosed herein. In addition, the busbars 151 may electrically connect each of the first to fourth secondary batteries 111, 112, 113, and 114 to the protection circuit unit 170. In one embodiment, the busbars 151 may extend from one side of the secondary battery unit 110 to the other side of the secondary battery unit 110 via a top portion of the secondary battery unit 110. The one side of the secondary battery unit 110 may refer to a side at which the first and second electrode terminals 11 and 12 of each of the first to fourth secondary batteries 111, 112, 113, and 114 and the safety vent 13 are aligned, and the other side of the secondary battery unit 110 may refer to a side opposite to the one side of the secondary battery unit 110. The protection circuit unit 170 may be positioned at the other side of the secondary battery unit 110.

As shown in FIG. 6, each of the multi-gaskets 152 may be coupled to a position corresponding to the safety vent 13 while passing through the busbar holder 150. The multi-gaskets 152 may include a plurality of gas holes corresponding to the safety vents 13 of the secondary batteries arranged in the vertical direction. For example, first and second gas holes 152a and 152b may be formed in a single multi-gasket 152. In one embodiment, the first and second gas holes 152a and 152b may correspond to the safety vents 13 of the first and second secondary batteries 111 and 112 arranged in the vertical direction. In the illustrated embodiment, two gas holes provided in the single multi-gasket 152 are exemplified, but aspects of the present invention are not limited thereto. For example, when five secondary batteries are arranged in the vertical direction, the single multi-gasket 152 may include five gas holes so as correspond to safety vents of the five secondary batteries. The multi-gasket 152 may be made of any type of gasket materials known in the related art.

In addition, as shown in FIG. 7, a top hooking portion 153a and a bottom hooking portion 153b may be formed in the busbar holder 150. The top hooking portion 153a may be formed at a top end of the busbar holder 150 and the bottom hooking portion 153b may be formed at a bottom end of the busbar holder 150. The top hooking portion 153a and the bottom hooking portion 153b are vertically bent with respect to the busbar holder 150 and may extend toward the fixing cover unit 120. In addition, the top hooking portion 153a and the bottom hooking portion 153b may be ring-shaped.

In one embodiment, as also shown in FIG. 8, a top protrusion 121d may be formed on the top surface of the top cover 121 and a bottom protrusion 122d may be formed on the bottom surface of the bottom cover 122. In one embodiment, the top protrusion 121d may be forcibly fit, e.g., interference fit, into the top hooking portion 153a and the bottom protrusion 122d may be forcibly fit into the top hooking portion 153a. Accordingly, the top and bottom ends of the busbar holder 150 may be firmly coupled to top and bottom ends of the fixing cover unit 120, respectively.

The insulation cover 160 may be coupled to the fixing cover unit 120 to cover the busbar holder 150. For example, second top coupling holes 160a may be formed at top ends of the insulation cover 160 and second bottom coupling holes 161b may be formed at bottom ends of the insulation cover 160. The second top coupling holes 160a may correspond to first top coupling holes 150a and the second bottom coupling holes 161b may correspond to first may correspond to first bottom coupling holes 150b. Accordingly, the insulation cover 160 and the busbar holder 150 may be firmly fastened with the fixing cover unit 120 through the coupling bolts 163.

As shown, for example, in FIGS. 1 and 6, the insulation cover 160 includes a duct 161 and a vent hole member 162. The duct 161 may be integrally formed with the insulation cover 160 by a duct groove 161a and a duct cover member 161b. The duct groove 161a may be formed in the insulation cover 160 to be connected to the safety vent 13 through the multi-gasket 152. The duct cover member 161b covers the duct groove 161a and may be coupled to the insulation cover 160. Accordingly, the duct groove 161a and the duct cover member 161b may constitute a duct structure in the insulation cover 160.

When gases are released from the secondary battery unit 110, the duct 161 may induce the gases G released through the safety vent 13 and the multi-gasket 152 to move to a first position P1.

The vent hole member 162 may be formed at the first position P1 and may be connected to the duct 161. Accordingly, the vent hole member 162 may release the gases G induced to the first position P1 through the duct 161. In one embodiment, the vent hole member 162 may be integrally formed with the duct cover member 161b to then be coupled to the insulation cover 160 together with the duct cover member 161b.

The protection circuit unit 170 may be accommodated in the housing 140 and may be electrically connected to the secondary battery unit 110 through the busbars 151 extending to the other side of the secondary battery unit 110. The protection circuit unit 170 may control charging/discharging operations of the secondary battery unit 110 and may prevent over-charge, over-discharge, or the like. The protection circuit unit 170 has a configuration well known in the related art to which the present invention pertains and a detailed description thereof will not be given.

According to the embodiments of the present invention, since the fixing cover unit 120 is made of an insulating material having resilience, unnecessary electric contacts occurring in the secondary battery unit 110 may be avoided and a swelling space can be secured during volumetric expansion of the secondary battery unit 110.

In addition, according to the embodiments of the present invention, a coupling force of the secondary battery unit 110 can be increased using the compression plate 130. In addition, the secondary battery unit 110 is compressed in horizontal and vertical directions, thereby minimizing the overall size of the secondary battery unit 110.

Further, according to the embodiments of the present invention, the secondary battery unit 110 can be more stably fixed to a particular position of a vehicle using the housing 140 and heat generated from the secondary battery unit 110 can more effectively release gases using the duct 161 integrally formed with the insulation cover 160.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A battery module comprising:
    a secondary battery unit including a plurality of secondary batteries, the plurality of secondary batteries each including electrode terminals and a safety vent which are arranged on one side of the secondary battery unit;

a compression plate wrapping at least a portion of the secondary battery unit and compressing the secondary battery unit together; and an insulation cover covering the electrode terminals and the safety vent, the insulation cover including a duct connected to the safety vent to guide gases exhausted from the safety vent to a first location, and a vent hole member coupled to the duct at the first location.

2. The battery module of claim 1, further comprising a fixing cover unit positioned between the secondary battery unit and the compression plate and covering the secondary battery unit to fix positions of the plurality of secondary batteries.

3. The battery module of claim 2, wherein the fixing cover unit comprises:

a top cover covering at least a portion of the secondary battery unit and including a first barrier separating the plurality of secondary batteries spaced in a first direction from each other;

a bottom cover covering at least a portion of the secondary battery unit opposite from the top cover and including a second barrier separating the plurality of secondary batteries spaced in the first direction from each other; and a third barrier coupled between the top cover and the bottom cover and separating the plurality of secondary batteries spaced in a second direction from each other.

4. The battery module of claim 1, further comprising a busbar holder positioned between the secondary battery unit and the insulation cover, coupled to the fixing cover unit, and including busbars electrically connected to the electrode terminals.

5. The battery module of claim 4, further comprising a plurality of gaskets each coupled to a location corresponding to the safety vent while passing through the busbar holder, each of the gaskets including a plurality of gas holes corresponding to the safety vents of the plurality of secondary batteries, the plurality of gaskets connecting the duct and the safety vents of the plurality of secondary batteries arranged in the second direction.

6. The battery module of claim 4, wherein ends of the busbar holder are coupled to ends of the fixing cover unit through bolt engagement, wherein at least one protrusions are formed on top and bottom surfaces of the fixing cover unit, and wherein ring-shaped hooking portions are formed at top and bottom ends of the busbar holder to forcibly couple the protrusions to the hooking portions.

7. The battery module of claim 6, wherein ends of the insulation cover are coupled to ends of the fixing cover unit together with the ends of the busbar holder through bolt engagement.

8. The battery module of claim 4, further comprising a protective circuit unit electrically connected to the secondary battery unit through the busbars.

9. The battery module of claim 1, wherein the compression plate comprises:

an upper compression plate compressing the secondary battery unit while covering the top portion of the secondary battery unit; and a lower compression plate combined with the upper compression plate and compressing the secondary battery unit while covering the bottom portion of the secondary battery unit, wherein ends of the upper compression plate are bent stepwise, and ends of the lower compression plate are welded to the ends of the upper compression plate such that the ends of the lower compression plate are on interior sides of the ends of the upper compression plate.

10. The battery module of claim 1, wherein duct comprises a duct groove connected to the safety vent and a duct cover member covering the duct groove and combined with the insulation cover.

* * * * *